(No Model.) 4 Sheets—Sheet 1.

D. B. FRASER.
MACHINE FOR HULLING, SCOURING, AND CLEANING COFFEE.

No. 528,595. Patented Nov. 6, 1894.

WITNESSES:
Ed. D. Miller.
W. B. Ellison

INVENTOR
David B. Fraser,
BY
Chas. O. Gill
ATTORNEY.

(No Model.) 4 Sheets—Sheet 2.
D. B. FRASER.
MACHINE FOR HULLING, SCOURING, AND CLEANING COFFEE.
No. 528,595. Patented Nov. 6, 1894.

(No Model.) 4 Sheets—Sheet 4.
D. B. FRASER.
MACHINE FOR HULLING, SCOURING, AND CLEANING COFFEE.
No. 528,595. Patented Nov. 6, 1894.
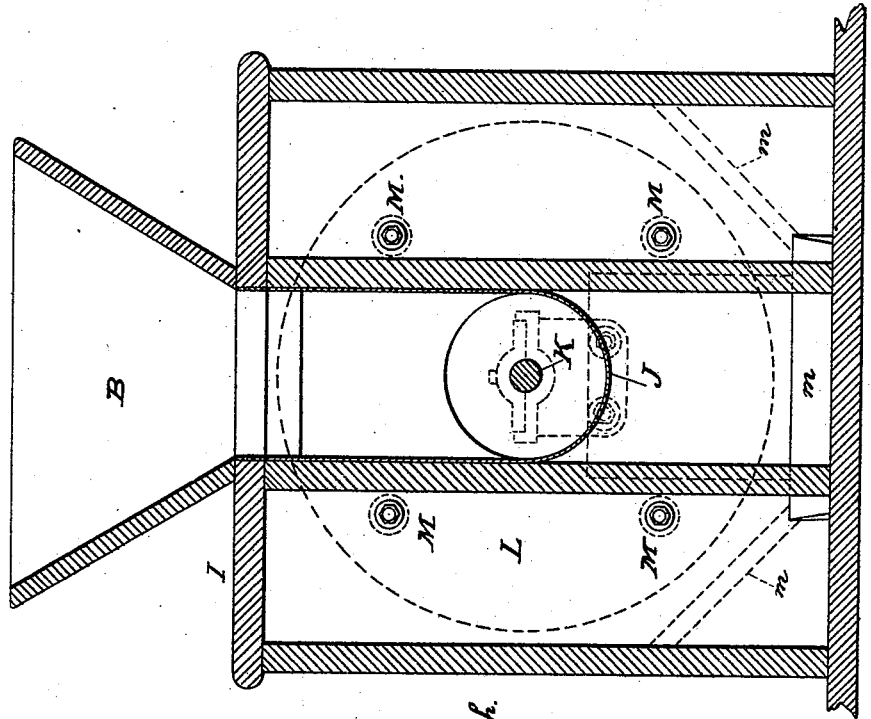
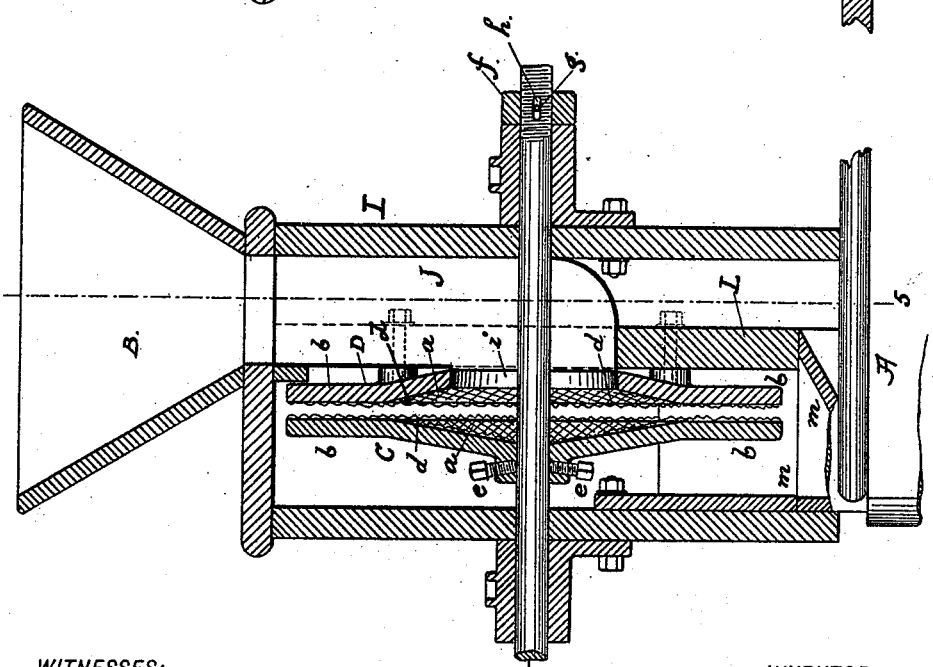
WITNESSES:
Ed. D. Miller.
W. B. Ellison
INVENTOR
David B. Fraser,
BY
Chas. B. Gill
ATTORNEY.

UNITED STATES PATENT OFFICE.

DAVID B. FRASER, OF NEW YORK, N. Y.

MACHINE FOR HULLING, SCOURING, AND CLEANING COFFEE.

SPECIFICATION forming part of Letters Patent No. 528,595, dated November 6, 1894.

Application filed January 4, 1894. Serial No. 495,639. (No model.)

*To all whom it may concern:*

Be it known that I, DAVID B. FRASER, a citizen of the United States, and a resident of New York, in the county of New York and State of New York, have invented certain new and useful Improvements in Machines for Hulling, Scouring, and Cleaning Coffee, of which the following is a specification.

The invention relates to improvements in machines for hulling, scouring and cleaning coffee, and consists in a machine comprising three connected and co-operating parts or sets of mechanism, the first thereof embracing a feed hopper and hulling plates between which the coffee is subjected to a rubbing action which in part loosens and removes the hull and parchment from the coffee beans preparatory to its further treatment, the second of said parts or sets consisting of a perforated scouring cylinder which receives the coffee from said plates and contains revoluble blades adapted to move against the coffee and effect its scouring within said cylinder, and the third of said parts or sets comprising a trunk which receives the coffee from said cylinder, a suction fan in communication with said trunk and a bin also in connection with said trunk, the purpose of the fan being to clean the coffee by elevating to the the bin all hulls and other foreign matter lighter than the coffee, while the latter is passing downward through the trunk to any suitable receiver therefor the whole being constructed and arranged as hereinafter particularly described and pointed out in the claims.

The object of my invention is to produce a machine in which by a continuous process without intermediate handling the coffee may successfully, rapidly and economically be hulled, scoured and cleaned without injury to the beans; and this object has been accomplished in the machine made the subject of this application and whose construction and operation will be fully understood from the detailed description hereinafter presented, reference being had to the accompanying drawings, in which—

Figure 1:
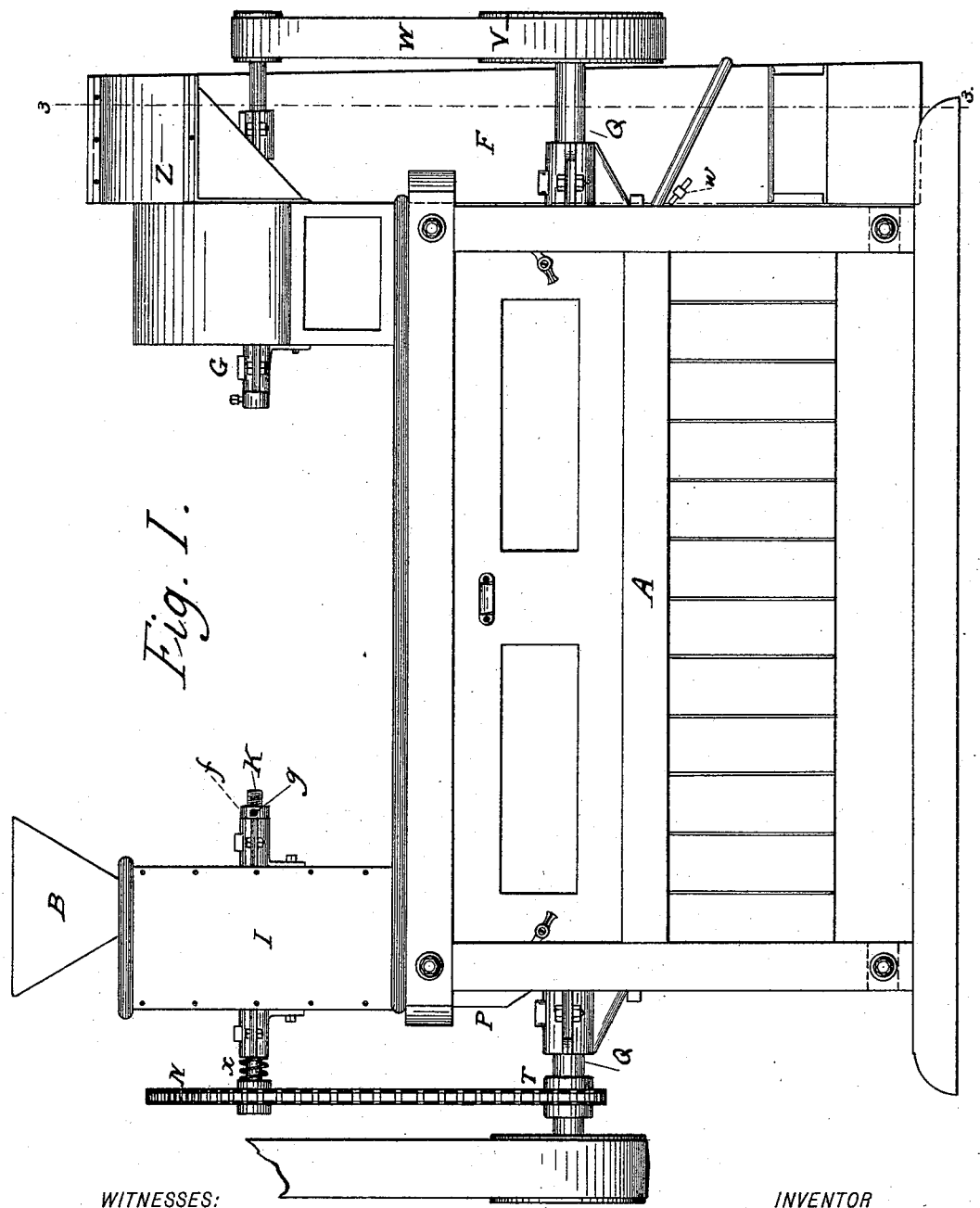
Figure 2:
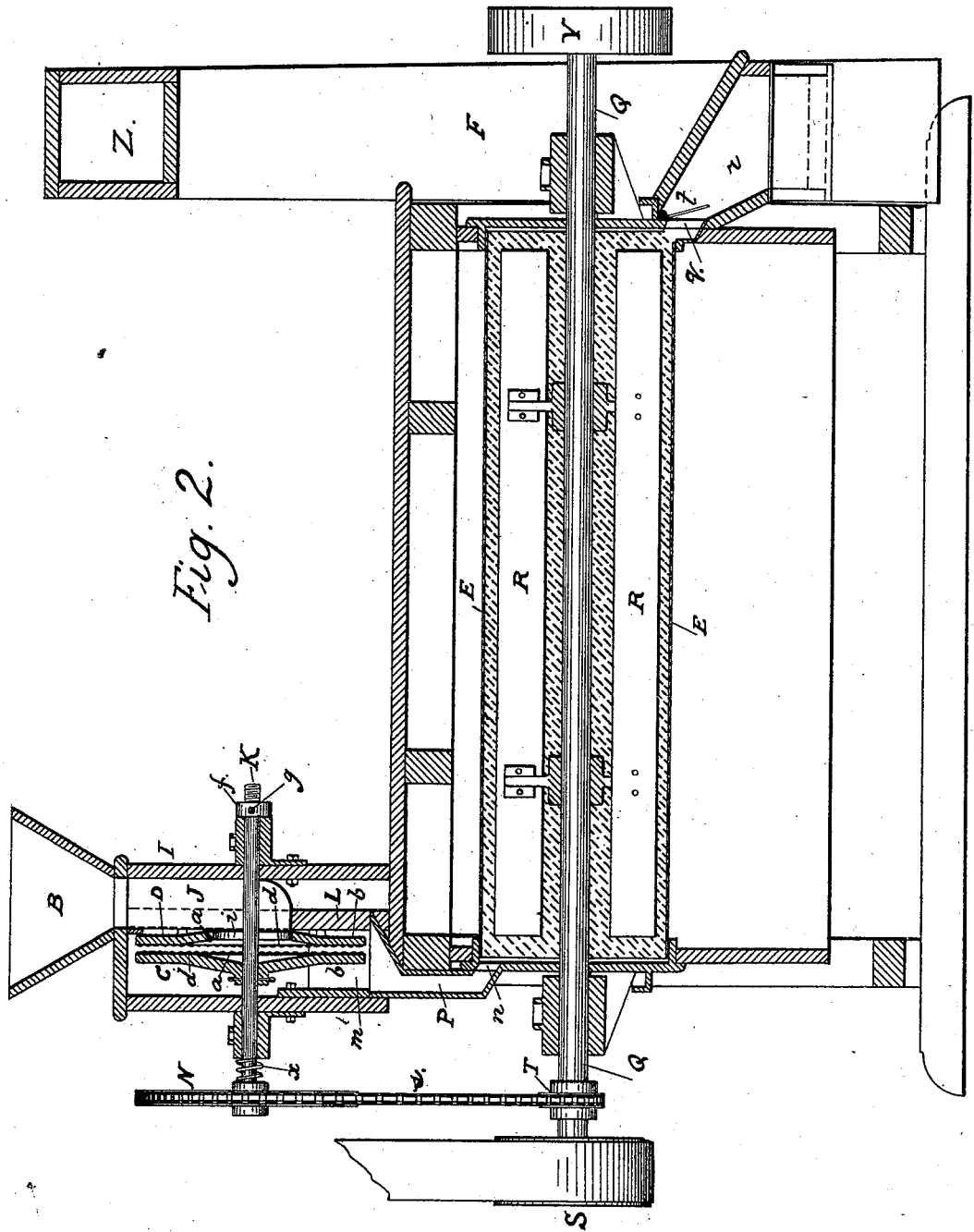
Figure 3:
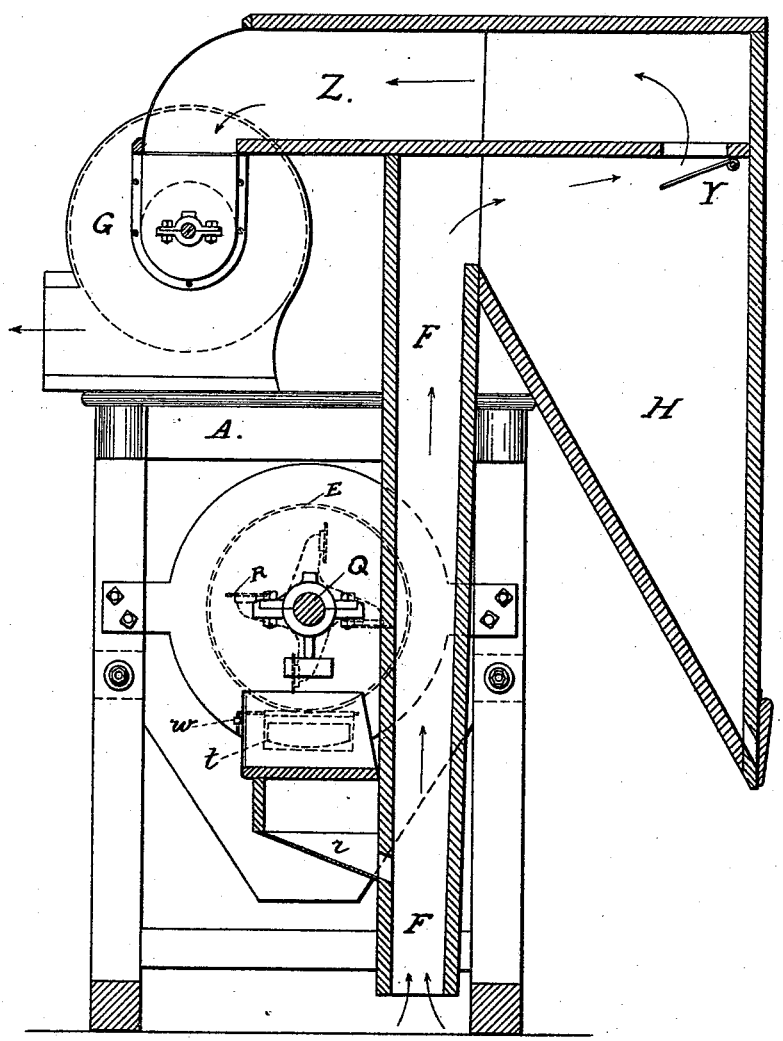

Figure 1 is side elevation of a machine constructed in accordance with and embodying the invention. Fig. 2 is a central vertical longitudinal section of same. Fig. 3 is a vertical transverse section of same on the dotted line 3—3 of Fig. 1. Fig. 4 is an enlarged central vertical section of the feed hopper and hulling plates, and Fig. 5 is a vertical transverse section of same on the dotted line 5—5 of Fig. 4.

In the drawings A designates the main supporting frame of the machine; B, the feed hopper; C, D, the hulling plates; E, the scouring cylinder; F, the discharge and cleaning trunk; G, the fan, and H, the bin which receives the hulls and other foreign matter drawn upward from the coffee.

Upon the forward end of the frame A is secured the frame I, which supports the feed hopper B, and contains the hulling plates C, D, the plate C being mounted upon the shaft K and adapted to revolve therewith, and the plate D being rigidly secured to the partition L by bolts M. The hulling plates C, D, have on their facing sides a concave central portion *a* surrounded by an annular flat portion *b*, as clearly shown in Fig. 4, and these facing surfaces of the plates C, D, will have a rough surface formed by the application thereto of perforated metal or wire cloth *d* or by directly cutting or casting thereon elevations and depressions to constitute a rasping or grating surface. I have found that when the surfaces of the plates C, D, are formed by applying thereto the rough perforated metal used for graters of various kinds, a very satisfactory result ensues.

The plate C may be adjusted on the shaft K toward or from the plate D either by means of the screws *e* or the longitudinal adjustment of the shaft K, which on one end carries the sprocket wheel N and at the other is threaded and slotted, as shown in Fig. 4, to receive the adjusting nut *f* and locking pin *g*, the latter being removable and closely fitting an aperture in the nut and entering the slot *h* in the shaft K. When the pin *g* is withdrawn from the nut *f*, the latter may be revolved freely and made to draw the shaft K and plate C toward the plate D or permit the drawing of the shaft K and plate C from the plate D by the spring *x*; and when the shaft K and plate C have been adjusted to the desired position the nut *f* will be locked by the pin *g*.

The purpose of the adjustment of the plates C, D, toward or from each other, is to adapt them for the different sizes and varieties of coffee, the object of the plates being to hull the coffee without crushing or injuring the beans. The center of the plate D is removed, as shown in Fig. 4, forming an inlet aperture $i$, which directly communicates with the neck J of the feed hopper B and through which all of the coffee must pass prior to passing to the scouring cylinder E.

The lower interior portion of the frame I, below the hulling plates C, D, is provided with the inclines $m$ leading downward to the flue P, which constitutes the means for directing the coffee from the frame I into the scouring cylinder E.

The cylinder E is mounted in the frame A, as more clearly shown in Fig. 2, and is preferably made of perforated metal. Extending longitudinally through the scouring cylinder E is the main driving shaft Q, upon which within the cylinder are the spiders carrying the blades R of usual construction.

Upon the forward end of the shaft Q is the power wheel S and sprocket wheel T, and upon the rear end of the said shaft Q is the belt wheel V, which is connected with the belt wheel on the shaft of the fan G by a belt W, as shown in Fig. 1, so that the motion of the shaft Q and fan G is simultaneous.

The forward end of the cylinder E has an inlet opening $n$ for the coffee, and the rear end of said cylinder has an exit opening $q$ for the coffee, said exit opening $q$ leading to a chute $r$ which directs the coffee into the side of the vertical trunk F, which is open at its lower end and at its upper end communicates with the bin H having an outlet door at its lower end and a damper Y at its upper end which communicates with the fan G through the flue Z. The exit $q$ from the cylinder E to the chute $r$ is provided with a weighted valve $t$, the weight $w$ being on an arm connected with the pivot rod on which the valve is hung. By adjusting the weight $w$ vertically on its arm, the resistance of the valve $t$ against opening may be regulated at will. The purpose of the weighted valve $t$ is to prevent the coffee from escaping too freely from the cylinder E, it being intended that the coffee shall only escape from the cylinder when its pressure therein is sufficient to automatically open the valve $t$ against the resistance of the weight thereon, thus retaining the coffee in the cylinder sufficiently to render the scouring operation effectual.

The sprocket wheel N on the shaft K is connected by a chain $s$ with the sprocket T on the driving shaft Q, and receives its motion from said driving shaft.

In the employment of the machine, power is applied to the driving shaft Q and, through said shaft, to the shaft K and fan G, whereupon the coffee to be treated will be placed in the hopper B and allowed to descend through the neck J and opening $i$ into the space between the plates C, D, where it will be subjected to the hulling operation by the action of the revolving plate C and the rough facing sides of said plate and the plate D. The coffee feeding downward to the plates C, D, of necessity passes between said plates and when hulled escapes therefrom and falls upon the inclines $m$, down which the coffee, with the hulls and parchment and any other foreign matter, moves to the flue P whereby it is directed into the cylinder E, in which the coffee is scoured, and finally escapes through the exit $q$ and down the chute $r$ into the trunk F, where it is subjected to the action of the fan G, the blast drawing upward into the bin H, the hulls, parchment and other light foreign matter, and allowing the cleaned coffee to descend through the bottom of said trunk.

The operation of the machine is continuous, the coffee being fed to hopper B as rapidly as the capacity will admit, and the cleaned coffee in the meantime escaping from the trunk F. During the operation of the machine, smaller pieces of hulls, coffee, parchment and dust will escape through the perforations in the cylinder E and fall down the inclined opposite sides of the lower part of the frame A to any suitable receptacle or trough.

The strength of the blast from the fan G upward through the trunk F may be regulated by the damper-valve Y, which is of usual construction and will be opened to a greater or less extent according to the degree of blast desired.

What I claim as my invention, and desire to secure by Letters Patent, is—

1. In a machine for hulling and scouring coffee, the feed hopper, the inclosed hulling plate C secured on the revoluble shaft extending through the frame inclosing said plate, and the stationary hulling plate D within said frame and having its central portion removed to form a substantial inlet opening $i$ extending entirely around said shaft, combined with the scouring cylinder receiving the coffee from said plates and containing the driving shaft and scouring blades; substantially as and for the purposes set forth.

2. In a machine for hulling and scouring coffee, the feed hopper, the inclosed hulling plate C secured on the revoluble shaft extending through the frame inclosing said plate, the stationary hulling plate D within said frame and having its central portion removed to form a substantial inlet opening $i$ extending entirely around said shaft, and the plates of perforated metal $d$ secured to the facing sides of said hulling plates C, D, combined with the scouring cylinder receiving the coffee from said plates and containing the driving shaft and scouring blades; substantially as and for the purposes set forth.

3. In a machine for hulling and scouring coffee, the feed hopper, the inclosed hulling plate C secured on the shaft extending through the frame inclosing said plate, and the stationary hulling plate D within said frame and having its central portion removed to form a substantial inlet opening $i$ extending entirely around said shaft, the said plates C, D, being concave at the center of their facing sides and flat at the outer portion of their facing sides, combined with the scouring cylinder receiving the coffee from said hulling plates and containing the driving shaft and scouring blades; substantially as and for the purposes set forth.

4. In a machine for hulling, scouring and cleaning coffee, the frame I supporting the hopper B and neck J leading therefrom, the horizontal shaft extending through said frame, the concave hulling plate C secured on said shaft, and the stationary concave hulling plate D having the opening $i$ extending entirely around said shaft in line with the outlet from said neck J, combined with the scouring cylinder E, the flue P leading from said frame to said cylinder, the driving shaft and blades within said cylinder, the vertical blast trunk F at the end of said cylinder, the chute $r$ leading from the cylinder to said trunk, and the bin and fan communicating with the upper end of said trunk, said bin having an outlet door at its lower end and a regulating valve at its upper end; substantially as and for the purposes set forth.

Signed at New York, in the county of New York and State of New York, this 2d day of of January, A. D. 1894.

DAVID B. FRASER.

Witnesses:
CHAS. C. GILL,
ED. D. MILLER.